United States Patent
Bartholomew, III et al.

(10) Patent No.: US 7,492,354 B2
(45) Date of Patent: Feb. 17, 2009

(54) INPUT DEVICE FOR A PORTABLE TERMINAL

(75) Inventors: William F. Bartholomew, III, Jackson, NJ (US); Ta Chen, Basking Ridge, NJ (US); Stephen K. Lau, Matawan, NJ (US); Stephen Muccione, Hackettstown, NJ (US); Ze Wang, Morrisville, PA (US)

(73) Assignee: Mochis Investment LLC, Dover, DE (US)

( * ) Notice: Subject to any disclaimer, the term of this patent is extended or adjusted under 35 U.S.C. 154(b) by 559 days.

(21) Appl. No.: 10/371,117

(22) Filed: Feb. 21, 2003

(65) Prior Publication Data

US 2003/0210224 A1      Nov. 13, 2003

(51) Int. Cl.
    *H04M 1/00*      (2006.01)
    *G06F 3/02*      (2006.01)
(52) U.S. Cl. ............... 345/169; 345/156; 455/575.3
(58) Field of Classification Search ......... 345/156–179, 345/95, 901; 455/90.2, 90.3, 566.1, 566.2, 455/575.1–575.4, 575.8, 566, 550.1, 557; 341/21, 22; 379/433.04, 433.07, 368; 348/14.02, 348/373–376
See application file for complete search history.

(56) References Cited

U.S. PATENT DOCUMENTS

| | | | |
|---|---|---|---|
| 4,899,137 A | 2/1990 | Behrens et al. | |
| 5,077,551 A | 12/1991 | Saitou | |
| 5,235,532 A | 8/1993 | Sugino | |
| 5,644,338 A | 7/1997 | Bowen | |
| 5,710,605 A * | 1/1998 | Nelson | 348/734 |
| 5,949,408 A | 9/1999 | Kang et al. | |
| 6,211,856 B1 * | 4/2001 | Choi et al. | 345/666 |
| 6,437,836 B1 * | 8/2002 | Huang et al. | 348/734 |
| 6,463,304 B2 * | 10/2002 | Smethers | 455/566 |

(Continued)

FOREIGN PATENT DOCUMENTS

EP      0458316 A2      11/1991

(Continued)

OTHER PUBLICATIONS

Alonso Y Goicolea, "International Application No. PCT/US 03/05466 International Search Report", Sep. 3, 2003, Published in: EP.

(Continued)

*Primary Examiner*—David L Lewis
(74) *Attorney, Agent, or Firm*—Fitch, Even, Tabin & Flannery

(57) ABSTRACT

An input device disposed on the rotatable cover of a portable terminal. The input device is a compound switch that has five binary switching elements. The input device includes an outer, ring-shape element and inner, circular-shape element. When a switching element is actuated, the portable terminal responds, wherein the response is a function of the operating mode of the portable terminal. A graphical representation of the input device appears in the display screen of the portable terminal. The graphical representation includes up to five icons, which correspond to the five binary switching elements. The icons are visually suggestive of the function of the associated switching element. The icons change, as a function of operating mode, to reflect the change in function of the switching elements from mode to mode.

16 Claims, 8 Drawing Sheets

U.S. PATENT DOCUMENTS

| | | | |
|---|---|---|---|
| 6,507,306 B1 * | 1/2003 | Griesau et al. | 341/176 |
| 6,580,932 B1 * | 6/2003 | Finke-Anlauff | 455/566 |
| 6,590,618 B1 * | 7/2003 | Park et al. | 348/734 |
| 6,593,914 B1 * | 7/2003 | Nuovo et al. | 345/169 |
| 6,633,281 B2 * | 10/2003 | Lin et al. | 345/173 |
| 6,658,272 B1 * | 12/2003 | Lenchik et al. | 345/164 |
| 6,680,676 B1 * | 1/2004 | Hayashi et al. | 341/22 |
| 6,766,182 B2 * | 7/2004 | Janninck et al. | 455/575.3 |
| 6,794,992 B1 * | 9/2004 | Rogers | 340/825.25 |
| 6,810,271 B1 * | 10/2004 | Wood et al. | 455/566 |
| 2001/0022839 A1 * | 9/2001 | Ishigaki | 379/433.04 |
| 2001/0040964 A1 * | 11/2001 | Deguchi | 379/433.01 |
| 2002/0006815 A1 | 1/2002 | Finke-Anlauff | |
| 2002/0163504 A1 * | 11/2002 | Pallakoff | 345/169 |
| 2003/0095096 A1 * | 5/2003 | Robbin et al. | 345/156 |
| 2004/0132482 A1 * | 7/2004 | Kang et al. | 455/550.1 |

FOREIGN PATENT DOCUMENTS

| | | | |
|---|---|---|---|
| EP | 0534478 | A2 | 9/1992 |
| EP | 0796026 | A2 | 9/1997 |
| EP | 0804009 | A2 | 10/1997 |
| EP | 9819434 | A1 | 5/1998 |
| EP | 0933908 | A2 | 8/1999 |
| EP | 0997810 | A2 | 5/2000 |
| EP | 1161062 | A2 | 12/2001 |
| FR | 2775857 | A1 | 9/1999 |
| GB | 2318195 | A | 4/1998 |
| JP | 11-150591 | * | 6/1999 |
| WO | 9712470 | A1 | 4/1997 |
| WO | 9819226 | A1 | 5/1998 |

OTHER PUBLICATIONS

Alonso Y Goicolea, "International Application No. PCT/US 03/04973 International Search Report", Sep. 3, 2003, Published in: EP.

De Biolley, L., "EP Application No. EP 01 30 4196 Search Report", Oct. 3, 2002, Publisher: EPO, Published in: The Hague.

De Biolley. L., "EP Application No. 99 66 0006 Search Report", Oct. 10, 2002, Published in: EP.

Alonso Y Goicolea, "International Application No. PCT/US 03/04972 International Search Report", Sep. 12, 2003, Published in: EP.

B G Western, "GB Application No. GB 9707235.9 Search Report", Jun. 6, 1997, Published in: GB.

* cited by examiner

INPUT DEVICE FOR A PORTABLE TERMINAL

FIELD OF THE INVENTION

The present invention relates to an input device for use with a combined wireless terminal and PDA.

BACKGROUND OF THE INVENTION

Hand-held processors, often referred to as a Personal Digital Assistant ("PDA"), are becoming increasingly popular. PDA's possess a relatively limited amount of information processing, storage and retrieval capabilities. With these limited capabilities, the PDA performs specific tasks, such as functioning as an electronic diary, phone book, personal database, memo taker, calculator, alarm clock, etc. A user can input data directly into a PDA using a stylus or a reduced-size keyboard. Additionally, PDAs are generally capable of exchanging information with a desk-top computer, either by a physical connection or an infrared transceiver. PDAs typically include a relatively large display (i.e., relative to the overall size of the PDA) and several buttons or keys for accessing specific applications and for scrolling to view information. Some PDAs also include a reduced-size keyboard.

Lately, wireless telecommunications capabilities have been incorporated into PDAs. Doing so provides advanced functions such as transmitting, receiving and displaying text messages. And it relieves a user of having to transport both a PDA and a wireless terminal (e.g., cellular telephone, pager, etc.).

Currently, most of the combined PDA/wireless terminals have one or more shortcomings that relate, among other areas of deficit, to compromised ergonomics or "user-friendliness" relative to a dedicated PDA or a dedicated wireless terminal. For example, some combined PDA/wireless terminals have hinged keyboards that rotate from a closed position to an open position for use. In some of these devices, the telecommunications capabilities can be accessed whether the keyboard is in the open or the closed position. While this arrangement provides a convenience for the user, it causes problems related to the usability of the display and the keys.

SUMMARY OF THE INVENTION

The illustrative embodiment of the present invention is a combined PDA/wireless terminal (hereinafter a "portable terminal"). The cover of the portable terminal includes an input device. The input device is used to access the telecommunications capabilities and/or PDA capabilities of the portable terminal.

The input device is a compound switch that has five binary switching elements. The input device includes an outer, ring-shape element and inner, circular-shape element. Four of the five binary switching elements are associated with the ring-shape element and the fifth binary switching element is associated with the circular-shape element.

When a switching element is actuated, the portable terminal responds (e.g., accepts a call, accesses a menu, selects a menu item, increases speaker volume, etc.). The particular response is a function of the operating mode of the portable terminal. The response can be a transition to a different operating mode (e.g., idle ⇒ active call, etc.), or to take an action incident to the transition (e.g., ending or holding a current call to accept a new call, etc.), or to take an action independent of a mode transition (e.g., increase voice volume, etc.). In some modes, not all of the switching elements are active.

In some embodiments, the input device is the only device on the cover that is capable of accessing the portable terminal's telecommunications capabilities. The input device cannot be used to input integers (i.e., as is normally done to input a telephone number to place a call via the portable terminal); rather, as indicated above, it accesses various menus, selects from among menu items (including phone numbers), and takes various actions.

A graphical representation of the input device appears in the display screen of the portable terminal. The graphical representation includes, as a function of operating mode, up to five icons. Each icon corresponds to one of the five binary switching elements and is visually suggestive of the function of the associated switching element. The icons change, as a function of operating mode, to reflect the change in function of the switching elements from mode to mode.

These and other variations of the illustrative embodiments of the present invention are described in further detail in the Detailed Description.

DETAILED DESCRIPTION

Figure 1:
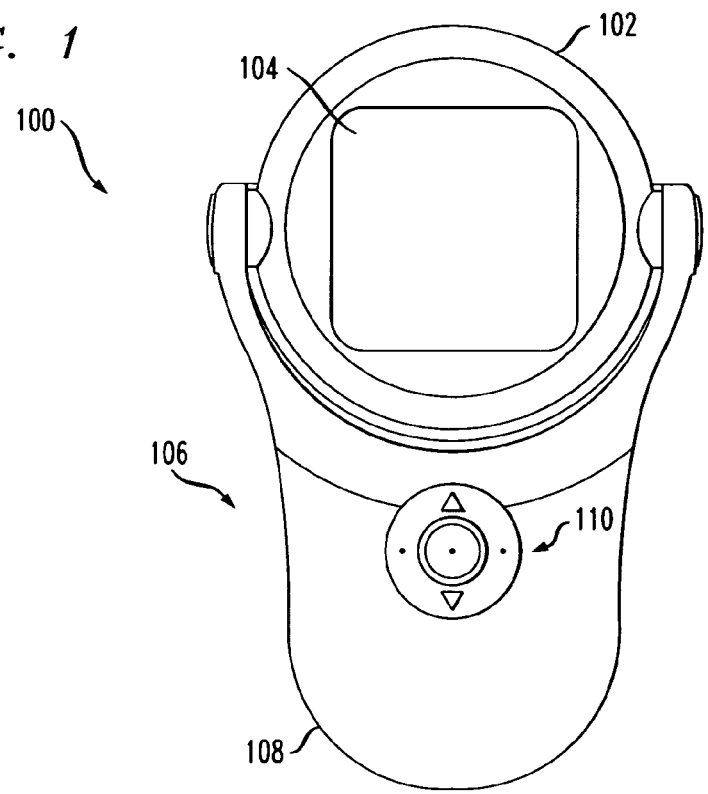
FIG. 1 depicts a plan view of a portable terminal in accordance with the illustrative embodiment of the present invention, wherein the portable terminal is closed.

FIG. 1 depicts a front view of portable terminal 100. Portable terminal 100 provides both wireless telecommunications capabilities and personal computing (i.e., PDA-type) capabilities. With regard to its telecommunications capabilities, portable terminal 100 is capable of transmitting and receiving both voice and data with wireless base stations (not shown) or other wireless terminals, or both. Additionally, portable terminal 100 is capable of supporting telecommunications with wireline terminals through a wireless base station and wireline infrastructure.

As to its personal computing capabilities, portable terminal 100 provides typical PDA computing and storage capabilities, including, without limitation, scheduling, address book storage and retrieval, note-taking, and an ability to run a variety of application software packages (e.g., calculators, games, etc.).

The design and operation of the basic circuitry and components (e.g., control circuitry, transceiver, antenna, speaker, microphone, display screen, keyboard, infrared transceiver, power supply, etc.) of a portable terminal having telecommunications and personal computing capabilities are quite familiar to those skilled in the art. Consequently, the basic circuitry and components will not be described here other than to provide context for the illustrative embodiment of the present invention.

With reference to FIGS. 1 through 4D, portable terminal 100 includes display 102 and keyboard housing 106. The keyboard housing consists of cover 108 and a portion of base 216 (see FIG. 2). Display 102 has a display screen 104, which is advantageously an LCD screen. Input device 110 is disposed on cover 108. In addition to any other functionality, input device 110 is capable of accessing the telecommunications capabilities of portable terminal 100. Input device 100 is described in more detail later in this specification.

Figure 3:
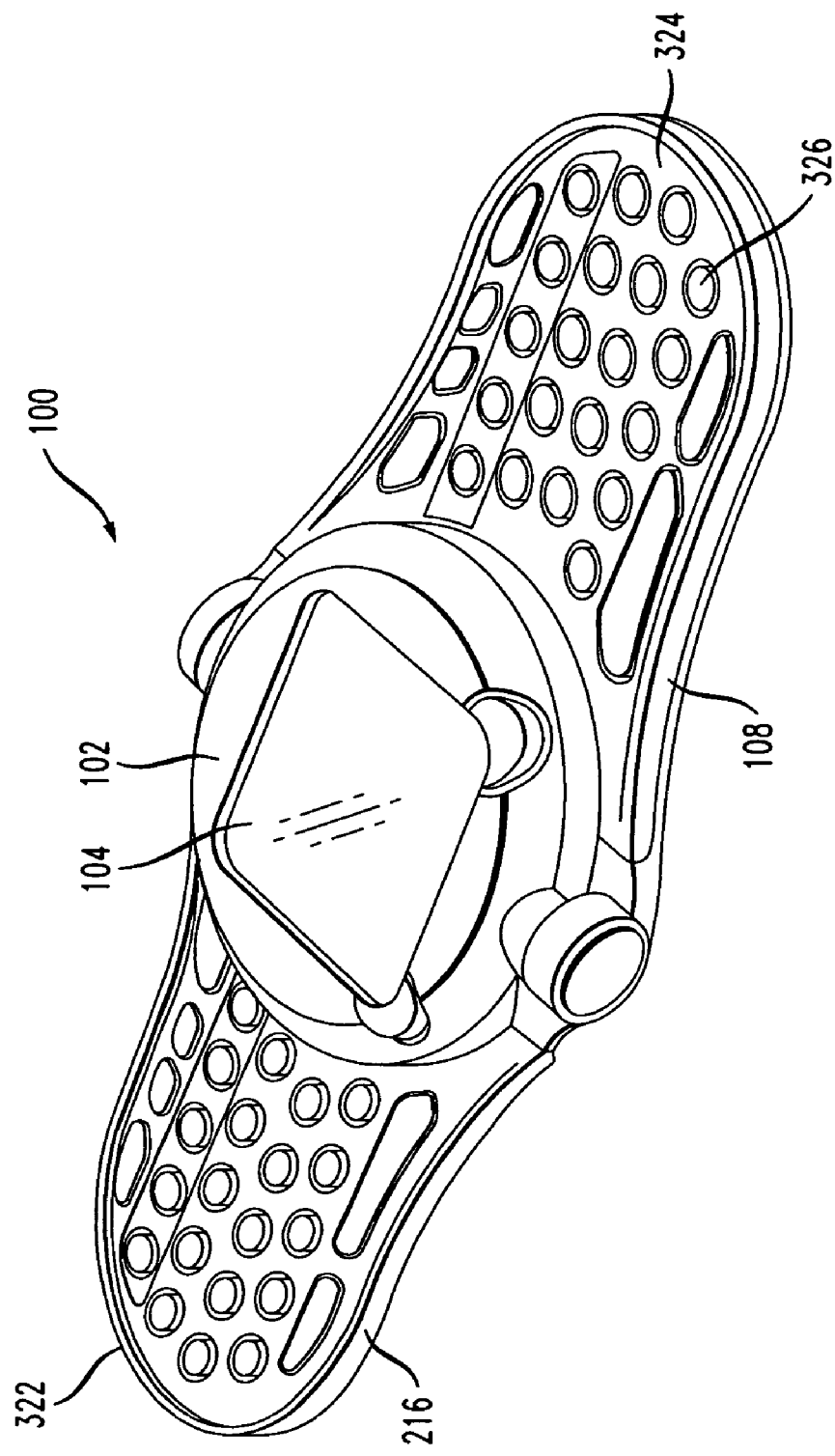
FIG. 3 depicts a perspective view of the portable terminal of FIG. 1, wherein the portable terminal is open.
Figure 4A:
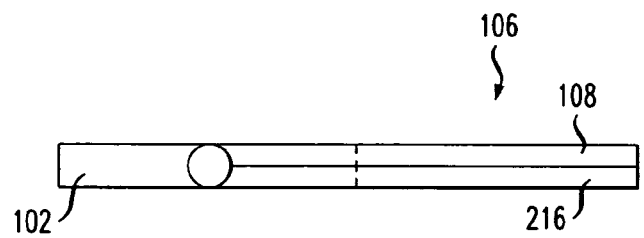
FIGS. 4A-4D depict the cover of a portable terminal in accordance with the illustrative embodiment being rotated from a fully-closed position (FIG. 4A) to a fully-open position (FIG. 4D).
Figure 4B:
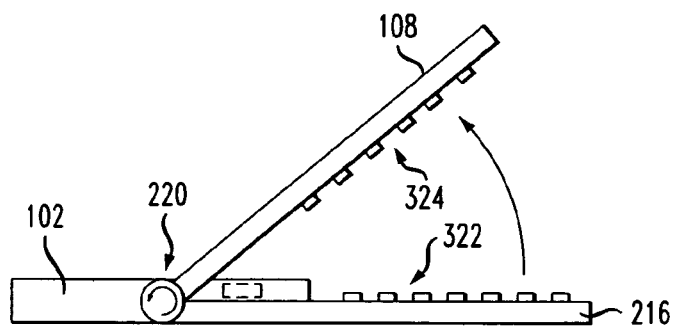
Figure 4C:
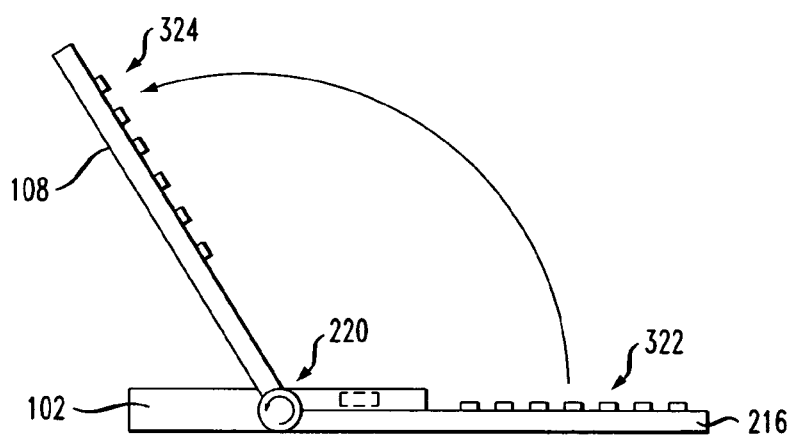
Figure 4D:
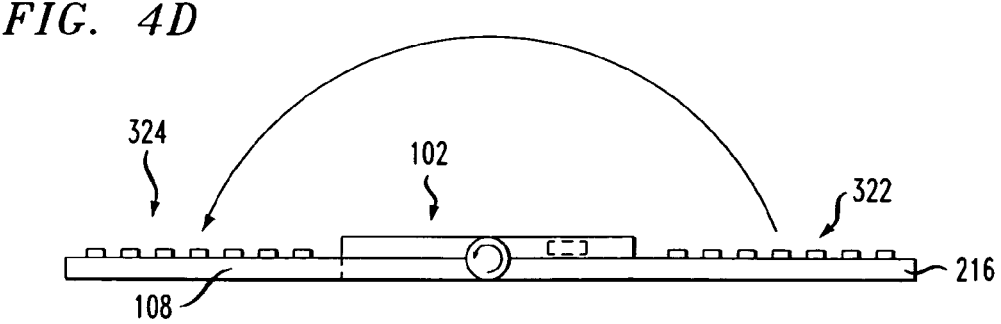

Portable terminal 100 can be used in either of two basic configurations: "closed," as depicted, for example, in FIGS. 1, 2, and 4A, or "open," as shown in FIGS. 3 and 4D. Display 102 is fully visible to a user when portable terminal 100 is closed and also when it's open.

Figure 2:
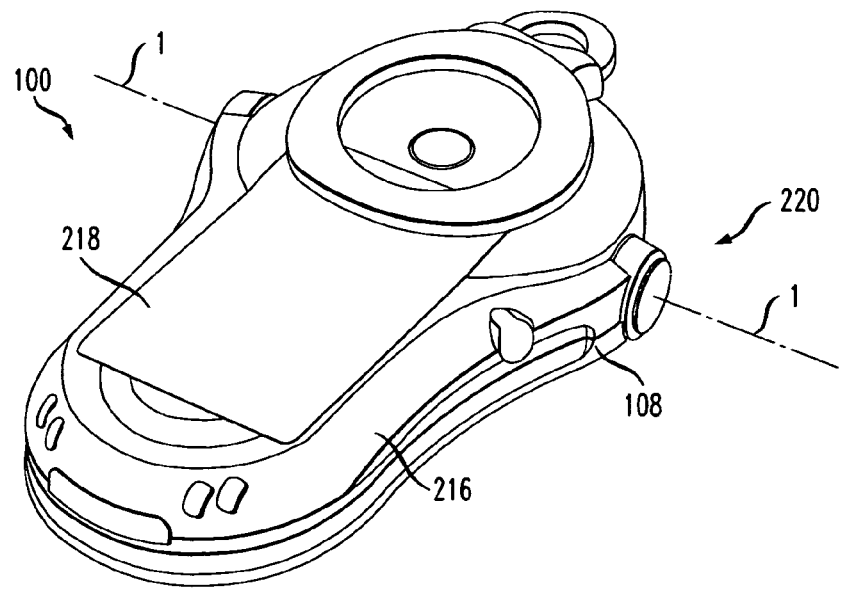
FIG. 2 depicts a back perspective view of the portable terminal of FIG. 1, wherein the portable terminal is closed.

As is perhaps most clearly shown in the illustrative embodiment depicted in FIG. 2, display 102 and base 216 are advantageously unified as a single, non-separable part. Cover 108 is rotatably connected to base 216 (and/or display 102) at pivot 220. By virtue of pivot 220, cover 108 is capable of rotating "out-of-plane" around pivot axis 1-1 between a fully closed position (e.g., FIG. 1, etc.) and a fully-open position (e.g., FIG. 3, etc.). (See, FIGS. 4A through 4D showing rotation from fully closed to fully open.) This "out-of-plane" rotation exposes the underside of cover 108, which includes portion 324 of a "split" or segmented keyboard.

When portable terminal 100 is closed, it is used in the manner of a conventional wireless terminal to send and receive calls. When closed, cover 108 is superposed over base 216 so that they coincide (i.e., defining keyboard-housing 106) and serve as a handle for gripping portable terminal 100 (in the manner of a conventional wireless phone).

When portable terminal 100 is open, both its telecommunications capabilities and the PDA capabilities (e.g., address book, schedule, etc.) are accessible. As previously described, to open portable terminal 100, cover 108 is rotated out-of-plane, away from base 216, as illustrated in FIGS. 4B and 4C.

Once opened, the keyboard of portable terminal 100 is exposed. In the illustrative embodiment, the keyboard is implemented in two portions: keyboard portion 322 and keyboard portion 324. Keyboard portion 322 is disposed within base 216 and keyboard portion 324 is disposed within cover 108. When portable terminal 100 is in the open position, display 102 is disposed between keyboard portion 322 and keyboard portion 324.

Keyboard portions 322 and 324 advantageously include a qwerty keyboard including keys 326. The keyboard also advantageously includes one or more linearly-arranged keypads for inputting numbers, and additional function keys (e.g., keys that access certain applications, such as an address book, schedule, note taker, etc., or that provide an ability to scroll, etc.) Additionally, keyboard portions 322 and 324 advantageously include keys that access various telecommunications functions (i.e., the ability to place a call, the ability to receive a call, etc.). In the illustrative embodiment, each of the keyboard portions contains about one-half the total number of keys. In some variations of the illustrative embodiment, the keys are unequally distributed between the two keyboard portions.

Additional description of portable terminal 100 (e.g., basic circuitry, components, the operation of same, etc.) is provided in U.S. patent application Ser. Nos. 60/359,199, 60/359,200, 10/161,831, and 10/207,643, all of which are incorporated by reference herein.

Figure 5:
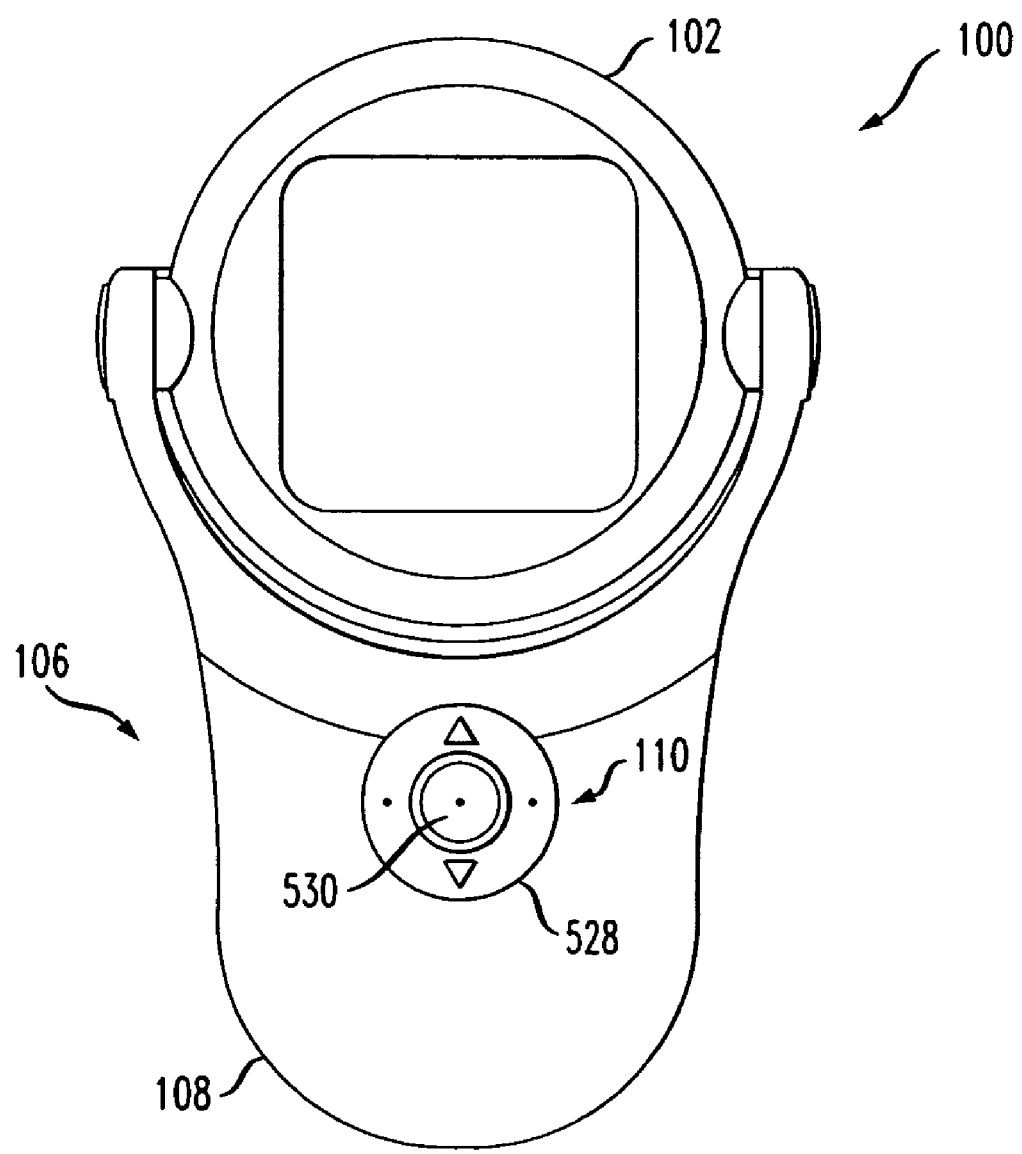
FIG. 5 depicts the portable terminal of FIG. 1.
Figure 6B:
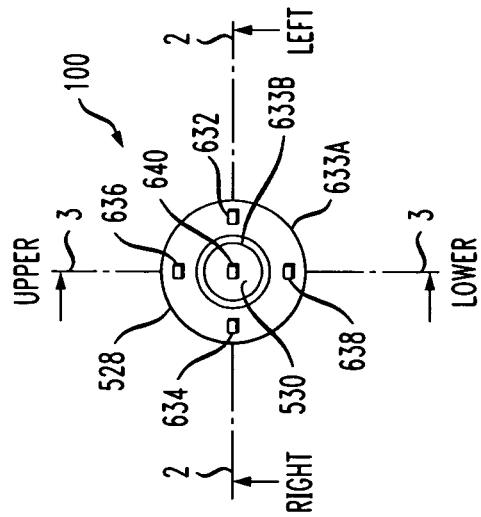
FIG. 6B depicts a bottom view of the input device that is disposed on the cover of the portable terminal of FIG. 1.
Figure 6A:
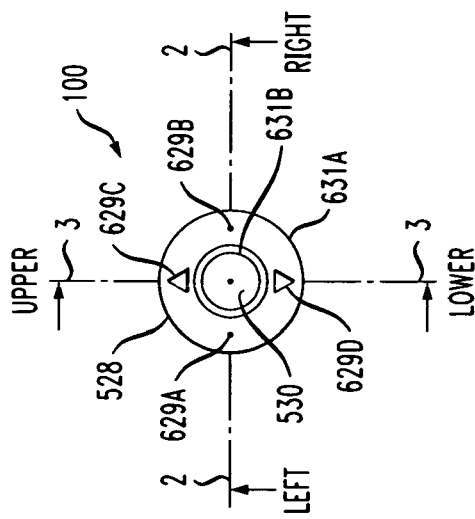
FIG. 6A depicts a plan view of the input device that is disposed on the cover of the portable terminal of FIG. 1.

Referring now to FIGS. 5 and 6A, input device 110 is configured as two concentric, tactile elements 528 and 530. More particularly, input device 110 includes outer, ring-shape element 528 and inner, circular-shape element 530.

Input device 110 is a compound switch having five switching elements. In the illustrative embodiment, input device 110 is mechanically implemented. That is, input device 110 physically moves when pressed, wherein the movement causes one of five mechanical "contacts" to engage an underlying contact to affect the operation of a circuit. It is to be understood that in variations of the illustrative embodiment, input device 110 is implemented in other ways. For example, input device 110 can use capacitance as an operating principle, in known fashion. It will be understood that the following description applies only to a mechanical implementation of input device 110; those skilled in the art will know how to design and build other implementations of input device 110.

In the illustrative embodiment depicted in FIG. 6B, the "underside" of input device 110 has a total of five binary contacts 632, 634, 636, 638, and 640 which can engage the circuitry of portable terminal 100. Four of the five binary contacts are disposed, at ninety-degree intervals, along lower surface 633A of ring-shape element 528. In particular, contact 632 is on the "Left" side of ring-shape element 528 aligned with axis 2-2, contact 634 is on the "Right" side aligned with axis 2-2, contact 636 is on the "Upper" portion aligned with axis 3-3, and contact 638 is on the "Lower" portion aligned with axis 3-3. Note that in the bottom view of input device 110 depicted in FIG. 6B, the directions "Left" and "Right" are inverted from their usual position since they are referenced to the top view of FIG. 6A. In other words, the view depicted in FIG. 6B is from "within" portable terminal 100, underneath input device 110. The fifth contact 640 is disposed at the center of input device 110 on lower surface 633B of circular-shape element 530.

As depicted in FIG. 6A, the upper surface 631A of ring-shape element 528 is advantageously adorned with markings 629A, 629B, 629C, and 629D (e.g., "arrows," "dots," etc.). The markings indicate the various positions at which ring-shape element 528 should be "pushed" to actuate it.

FIGS. 7A through 7C, 8A through 8C and 9 depict the operation of illustrative input device 110. In this "mechanical" implementation of input device 110, ring-shape element 528 is configured, in known fashion, to rotate about two axes: Left-Right axis 2-2 and Upper-Lower axis 3-3.

Figure 7C:
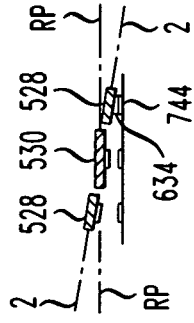
FIGS. 7B and 7C depict a cross-sectional view of the input device of FIG. 6 along the axis 2-2 from the indicated perspective, showing the outer ring-shape element of the input device in a first and second actuating position.
Figure 7B:
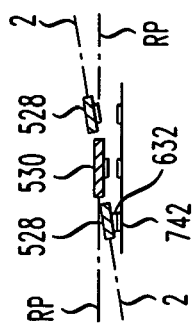
Figure 7A:
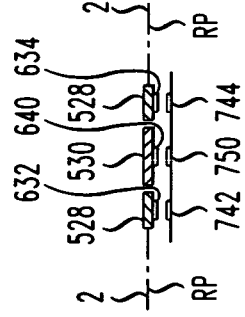
FIG. 7A depicts a cross-sectional view of the input device of FIG. 6 along the axis 2-2 from the indicated perspective, showing the input device in a non-actuated position.

FIG. 7A shows a cross-sectional view of input device 110 along Left-Right axis 2-2 in the direction indicated by the arrows. As shown in FIG. 7A, "Left" contact 632 overlies circuitry contact 742, "Right" contact 634 overlies circuitry contact 744 and central contact 740 overlies circuitry contact 750. Circuitry contacts 742, 744, and 750 are electrically connected to circuitry of portable terminal 100 to perform a variety of functions, as described later in this specification.

In the illustration of FIG. 7A, input device 110 is not actuated (the contacts of the input device do not touch the underlying circuitry contacts). As shown in FIG. 7A, when input device 110 is not actuated, ring-shape element 528 and circular-shape element 530 are aligned with reference plane RP.

FIG. 7B depicts the actuation of "Left" contact 632 and FIG. 7C depicts the actuation of "Right" contact 634. To actuate "Left" contact 632, ring-shaped element 528 is pushed at marking 629A. This causes ring-shape element 528 to rotate about Upper-Lower axis 3-3, wherein the "Left" side of ring-shape element 528 drops below reference plane RP. As a consequence, contact 632 and circuit contact 742 electrically engage one another.

"Right" contact 634 is actuated in similar fashion, wherein ring-shape element 528 is pushed at marking 629B. This causes the above-described rotation of ring-shape element 528 about axis 3-3, with the result that the "Right" side of ring shape element 528 drops below reference plane RP. Consequently, contact 634 and circuit contact 744 electrically engage each other.

Figure 8C:
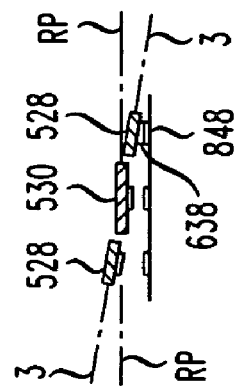
FIGS. 8B and 8C depict a cross-sectional view of the input device of FIG. 6 along the axis 3-3 from the indicated perspective, showing the outer ring-shape element of the input device in a third and fourth actuating position.
Figure 8B:
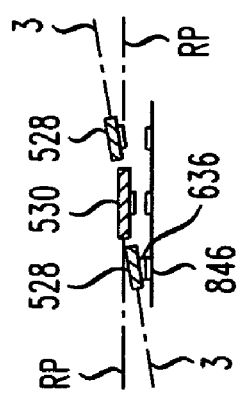
Figure 8A:
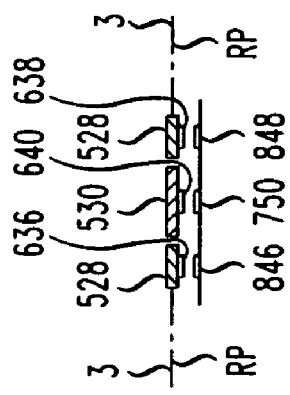
FIG. 8A depicts a cross-sectional view of the input device of FIG. 6 along the axis 3-3 from the indicated perspective, showing the input device in a non-actuated position.

FIG. 8A shows a cross-sectional view of input device 110 along Upper-Lower axis 3-3 in the direction indicated by the arrows. As shown in FIG. 8A, "Upper" contact 636 overlies circuitry contact 846, "Lower" contact 638 overlies circuitry contact 848 and central contact 740 overlies circuitry contact 750. Circuitry contacts 846 and 848 are electrically connected to circuitry of portable terminal 100 to perform a variety of functions, as described later in this specification.

FIG. 8B depicts the actuation of "Upper" contact 636 and FIG. 8C depicts the actuation of "Lower" contact 638. To actuate "Upper" contact 636, ring-shaped element 528 is pushed at marking 629C. This causes ring-shape element 528 to rotate about Left-Right axis 2-2, wherein the "Upper" portion of ring-shape element 528 drops below reference plane RP. As a consequence, contact 636 and circuit contact 846 electrically engage each other.

"Lower" contact 638 is actuated in similar fashion, wherein ring-shape element 528 is pushed at marking 629D. This causes the above-described rotation of ring-shape element 528 about axis 2-2, with the result that the "Lower" portion of ring shape element 528 drops below reference plane RP. As a consequence, contact 638 and circuit contact 848 electrically engage each other.

Figure 9:
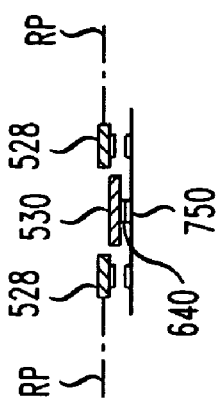
FIG. 9 depicts a cross-sectional view of the input device of FIG. 6, showing the inner, circular-shape element of the input device in an actuating position.

FIG. 9 depicts the actuation of circular element 530. As element 530 is pushed, it drops below reference plane RP causing contact 640 to electrically engage circuit contact 750.

When a contact of input device 110 electrically engages an underlying circuit contact, one or more circuits of portable terminal are affected (e.g., changes in current flow, etc.). This prompts, in known fashion, a response by portable terminal 100 (e.g., calling up a menu, answering a call, navigating through a menu, etc.).

In some embodiments, input device 110 is capable of accessing the telecommunications capabilities of portable terminal 100 and some PDA capabilities. In fact, in some embodiments, input device 110 is the only device that is disposed on cover 108 or housing 106 that is capable of accessing the telecommunications capabilities of portable terminal 100. In some embodiments, including some in which input device 110 is the only device on cover 108 or housing 106 that is capable of accessing the telecommunications capabilities of portable device 100, input device 110 is not capable of inputting integers, such as is required when inputting a telephone number to place a call via portable terminal 100.

Input device 110 is advantageously capable of accessing many different states or modes of operation of portable terminal 100, and/or causing it to take a variety of different actions. But this capability presents a difficulty—namely, conveying to a user how input device 110 functions in each of the different modes of operation. In other words, for any given mode of operation of portable terminal 100, what will be the response when any one of the five binary switching elements of input device 110 is actuated?

Figure 10:
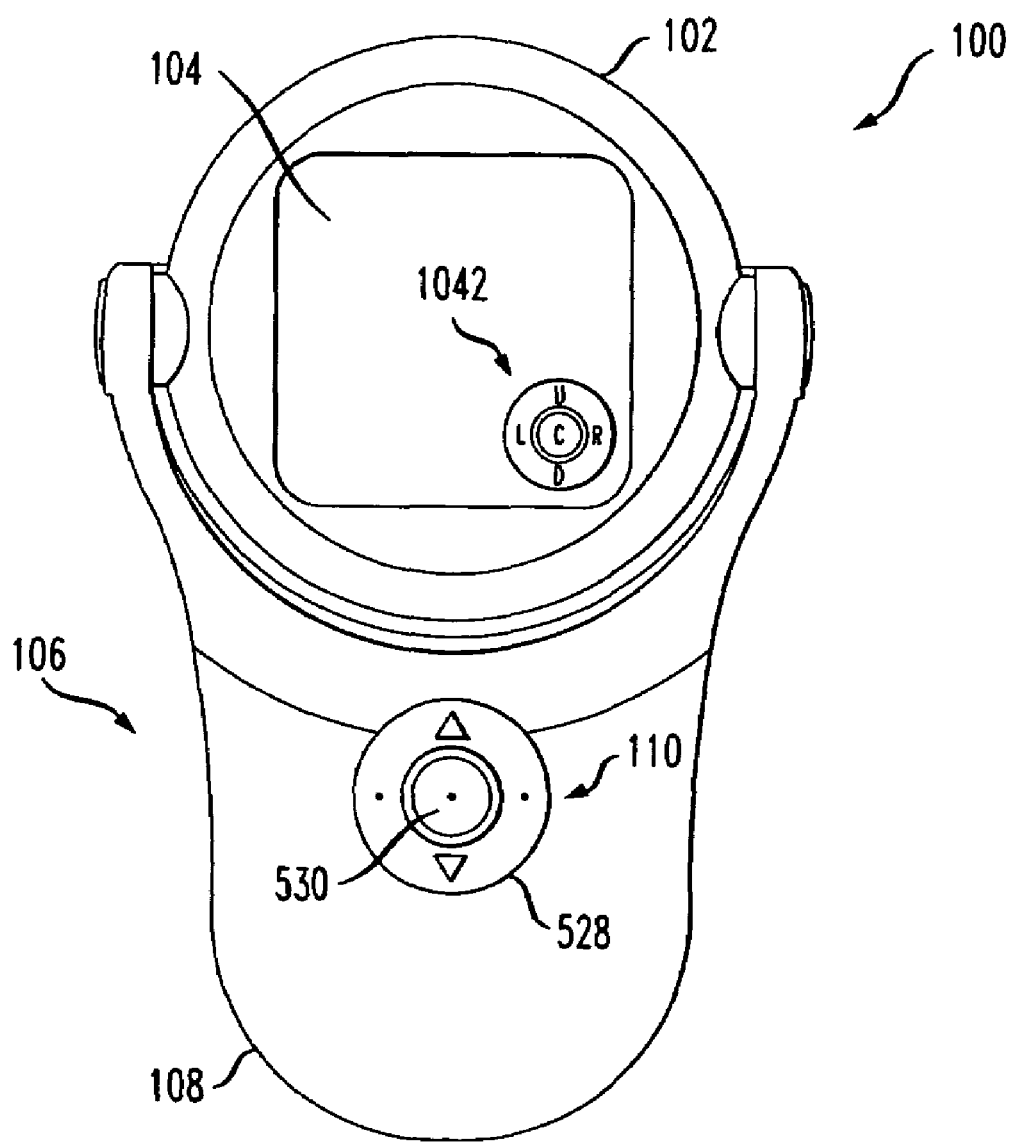
FIG. 10 depicts a portable terminal in accordance with the illustrative embodiment of the present invention, wherein a graphical representation of the input device of FIG. 6 appears in the display screen.

In accordance with the illustrative embodiment, and as is depicted in FIG. 10, graphical representation 1042 of input device 110 appears in display screen 104. Graphical representation 1042 provides a user with a pictorial indication of the responses elicited by the five binary switching elements of input device 110 as a function of the mode of operation of portable terminal 100. In some embodiments, the pictorial indication can be accompanied by text.

In graphical representation 1042 of FIG. 10, the pictorial indications are provided by icons that are located in the positions occupied by the call-outs "L," "R," "C," "U," and "D." The icons are advantageously suggestive of the function that each of the switching elements provides in any give mode of operation of portable terminal 100. Consequently, the icons will change as the mode of operation of portable terminal 100 changes.

Ten operating modes of portable terminal 100 are described below. For each mode, an illustrative graphical representation 1042 is depicted (see, FIGS. 11A through 11J). Each graphical representation 1042 includes a maximum of five icons: "L," "R," "C," "U," and "D," which are indicative of the functioning of each of the five binary switching elements of input device 110. For convenience, the five locations at which input device 100 is pressed (i.e., four on ring-shape element 528 and one on circular-shape element 530 are hereinafter referred to as "keys." The keys are identified as "Left" (at marking 629A), "Right" (at marking 629B), "Up" (at marking 629C), "Down" (at marking 629D), and "Center" (corresponding to circular-shape element 530 ).

Mode 1

In Mode 1, portable terminal 100 is unlocked and idle. In this mode, the keys cause the following responses and the icons take the following form:

TABLE 1

Key Functionality and Icon Description for Mode 1

| Key | Response | Icon | Depiction |
|---|---|---|---|
| Left | Go to Main Menu | L | A house |
| Right | Go to Call Log | R | The letters "L-O-G" |
| Center | Go to Recent Call List | C | A sheet of paper with the symbol "#" |
| Up | Go to Ring Profile | U | A bell and a sheet of paper |
| Down | Go to Phone Book | D | An open book |

Figure 11A:
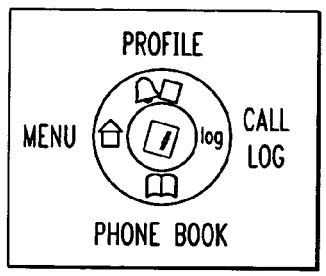
FIGS. 11A-11J depict variations of the graphical representation of FIG. 10 as a function of the mode of the portable terminal.

The icons described in Table 1, which are for use with graphical representation 1042 in Mode 1, are depicted in FIG. 11A. To the extent possible, the icons shown in FIG. 11A are advantageously suggestive of the function of each key when portable terminal 100 is in Mode 1. For example, icon "L," which depicts a house or home, is meant to signify "go to main menu." Likewise, icon "D," which depicts an open book, is meant to signify "go to phone book."

Mode 2

In Mode 2, portable terminal 100 is receiving an incoming call. In this mode, the keys cause the following responses and the icons take the following form:

TABLE 2

Key Functionality and Icon Description for Mode 2

| Key | Response | Icon | Depiction |
|---|---|---|---|
| Left | Mute/Un-mute ring | L | A phone and a sound wave |
| Right | Reject the call | R | A phone and an "X" |
| Center | Accept the call | C | A phone |
| Up | Increase ringer volume | U | A bell and an upward-pointing arrow |
| Down | Decrease ringer volume | D | A bell and a downward-pointing arrow |

Figure 11B:
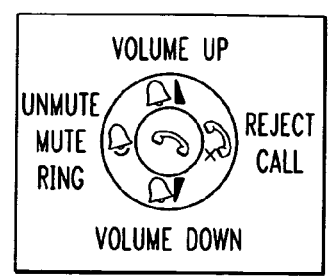

The icons described in Table 2, which are for use with graphical representation 1042 in Mode 2, are depicted in FIG. 11B.

Mode 3

In Mode 3, portable terminal 100 has an active call. In this mode, the keys cause the following responses and the icons take the following form:

TABLE 3

Key Functionality and Icon Description for Mode 3

| Key | Response | Icon | Depiction |
|---|---|---|---|
| Left | Go to phone book | L | An open book |
| Right | Mute/Un-Mute voice | R | A speaker with a covered cone |
| Center | End the call | C | A phone placed on a switch hook |
| Up | Increase voice volume | U | A speaker and an upward-pointing arrow |
| Down | Decrease voice volume | D | A speaker and a downward-pointing arrow |

Figure 11C:
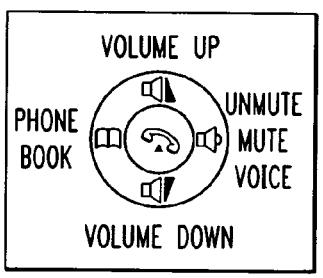

The icons described in Table 3, which are for use with graphical representation 1042 in Mode 3, are depicted in FIG. 11C.

Mode 4

In Mode 4, portable terminal 100 has an incoming call and an active call. In this mode, the keys cause the following responses and the icons take the following form:

TABLE 4

Key Functionality and Icon Description for Mode 4

| Key | Response | Icon | Depiction |
|---|---|---|---|
| Left | End current call; accept new call | L | A phone |
| Right | Reject new call | R | A phone and an "X" |
| Center | Hold current call; switch to new call | C | Two phones |
| Up | Increase voice volume | U | A speaker and an upward-pointing arrow |
| Down | Decrease voice volume | D | A speaker and a downward-pointing arrow |

Figure 11D:
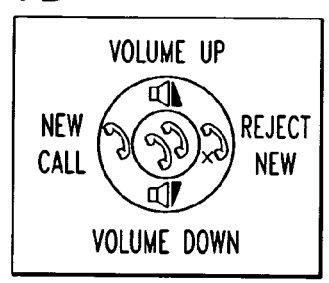

The icons described in Table 4, which are for use with graphical representation 1042 in Mode 4, are depicted in FIG. 11D.

Mode 5

In Mode 5, portable terminal 100 has more than one active call. In this mode, the keys cause the following responses and the icons take the following form:

TABLE 5

Key Functionality and Icon Description for Mode 5

| Key | Response | Icon | Depiction |
|---|---|---|---|
| Left | Go to phone book | L | A phone book |
| Right | End the current call; switch to the other call | R | A phone |
| Center | Hold current call; switch to new call | C | Two phones |
| Up | Increase voice volume | U | A speaker and an upward-pointing arrow |
| Down | Decrease voice volume | D | A speaker and a downward pointing arrow |

Figure 11E:
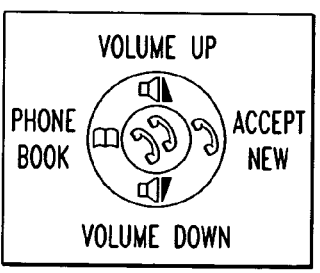

The icons described in Table 5, which are for use with graphical representation 1042 in Mode 5, are depicted in FIG. 11E.

Mode 6

In Mode 6, portable terminal 100 has at least one active call, and the phone book is open in the display (so that the user can check the phone book during the call). In this mode, the keys cause the following responses and the icons take the following form:

TABLE 6

Key Functionality and Icon Description for Mode 6

| Key | Response | Icon | Depiction |
|---|---|---|---|
| Left | Select item | L | An arrow |
| Right | End the current call; switch to another call if (# calls > 0) | R | A phone |
| Center | Hold current call; switch to another call if (# calls > 0) | C | Two phones |
| Up | Go to the previous item | U | A leftward-pointing arrow |
| Down | Go to the next item | D | A rightward-pointing arrow |

Figure 11F:
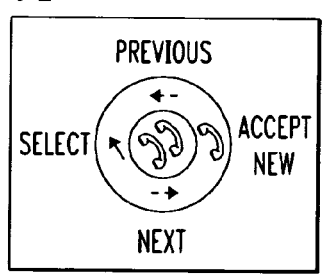

The icons described in Table 6, which are for use with graphical representation 1042 in Mode 6, are depicted in FIG. 11F.

Mode 7

In Mode 7, an alarm that had been set expires. In this mode, the keys cause the following responses and the icons take the following form:

TABLE 7

Key Functionality and Icon Description for Mode 7

| Key | Response | Icon | Depiction |
|---|---|---|---|
| Left | None | L | None |
| Right | None | R | None |
| Center | End the ring, but keep content on the display screen | C | A bell with an "X" |
| Up | None | U | None |
| Down | None | D | None |

Figure 11G:
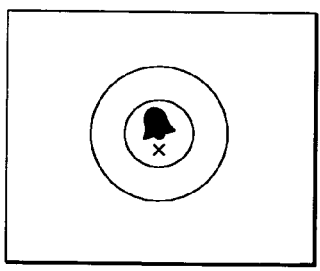

The icons described in Table 7, which are for use with graphical representation 1042 in Mode 7, are depicted in FIG. 11G.

Mode 8

In Mode 8, short message service ("SMS") arrives and auto display is on. In this mode, the keys cause the following responses and the icons take the following form:

TABLE 8

Key Functionality and Icon Description for Mode 8

| Key | Response | Icon | Depiction |
|---|---|---|---|
| Left | Go to menu | L | A house |
| Right | Go to reply | R | A pencil |
| Center | End the display | C | A display with an "X" |
| Up | Scroll up | U | A upward-pointing arrow |
| Down | Scroll down | D | A downward-pointing arrow |

Figure 11H:
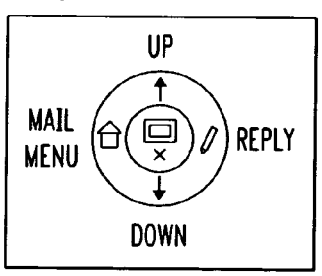

The icons described in Table 8, which are for use with graphical representation 1042 in Mode 8, are depicted in FIG. 11H.

Mode 9

In Mode 9, e-mail is received by portable terminal 100, and the auto-display is on. In this mode, the keys cause the following responses and the icons take the following form:

TABLE 9

Key Functionality and Icon Description for Mode 9

| Key | Response | Icon | Depiction |
|---|---|---|---|
| Left | Go to menu | L | A house |
| Right | Open the e-mail | R | An envelope and an "e" |
| Center | End the display | C | A display with an "X" |
| Up | Scroll up | U | A upward-pointing arrow |
| Down | Scroll down | D | A downward-pointing arrow |

Figure 11I:
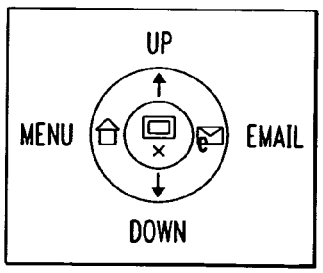

The icons described in Table 9, which are for use with graphical representation 1042 in Mode 9, are depicted in FIG. 11I.

Mode 10

In Mode 10, an e-mail menu is open. In this mode, the keys cause the following responses and the icons take the following form:

TABLE 10

Key Functionality and Icon Description for Mode 10

| Key | Response | Icon | Depiction |
|---|---|---|---|
| Left | Go to menu | L | A house |
| Right | Back to upper menu level | R | An leftward-pointing arrow |
| Center | Go back to unlock idle mode | C | An unlocked lock |
| Up | Scroll up | U | A upward-pointing arrow |
| Down | Scroll down | D | A downward-pointing arrow |

Figure 11J:
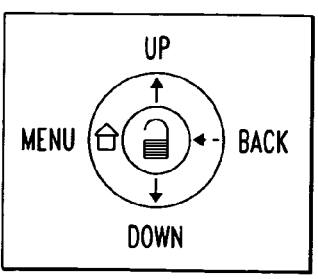

The icons described in Table 10, which are for use with graphical representation 1042 in Mode 10, are depicted in FIG. 11J.

As those skilled in the art will appreciate, the "response" of portable terminal 100 to actuation of the input device 110 includes transitions to other modes of operation, actions, actions incident to transitions, etc. It is also understood that portable terminal 100 has many other modes of operation or states. The ten modes described above are simply illustrative of the way input device 110 and graphical representation 1042 are used to enable a user to access telecommunications and other capabilities of portable terminal 100.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

We claim:

1. A portable terminal comprising:
   a base;
   a display, wherein said display is coupled to said base, and wherein said display has a display screen;
   a cover, wherein said cover is rotatably coupled, for out-of-plane rotation, to at least one of either said display or said base; and
   an input device for accessing telecommunications capabilities of said portable terminal, wherein said input device:
   is disposed on said cover; and
   has two, concentric, tactile elements, comprising:
      an outer, ring-shape element; and
      an inner, circular-shape element;
   wherein said input device is the only device disposed on said cover that is capable of accessing said telecommunications capabilities of said portable terminal.

2. The portable terminal of claim 1 wherein said input device is a compound switch having five switching elements.

3. The portable terminal of claim 1 wherein said ring-shape element has four binary contacts.

4. The portable terminal of claim 3 wherein said four binary contacts are disposed at ninety-degree intervals along said ring-shape element.

5. The portable terminal of claim 4 wherein said circular-shape element has one binary contact.

6. The portable terminal of claim 5 wherein in at least some modes of said portable terminal, a first one of said four binary contacts of said ring-shape element increases a voice volume of said portable terminal and a second one of said four binary contacts decreases said voice volume of said portable terminal.

7. The portable terminal of claim 1 wherein in various modes of said portable terminal, said circular shape element is capable of accepting a call, ending a call, and holding a current call and switching to another call.

8. The portable terminal of claim 1 wherein there are no modes of said portable terminal in which said ring-shape element or said circular-shape element are capable of sending a signal representative of an integer number selected from the group consisting of one through nine.

9. The portable terminal of claim 1 wherein said portable display further comprises a graphical representation of said input device, wherein said graphical representation:
   appears in said display screen;
   is indicative of a function of each of said five switching elements.

10. The portable terminal of claim 9 wherein the indicated functions change with some changes in mode of said portable terminal.

11. A portable terminal comprising:
   a base;
   a display, wherein said display is coupled to said base, and wherein said display has a display screen;
   a cover, wherein said cover is rotatably coupled, for out-of-plane rotation, to at least one of either said display or said base; and
   an input device, wherein said input device:
   is disposed on said cover;
   comprises two, concentric, tactile elements providing a total of five switching elements, wherein, for at least some modes of said portable terminal, at least some of said five binary switching elements are capable of transitioning between operating modes of said portable terminal, and further wherein said tactile elements comprise:
- an outer, ring-shape element having four of said five binary switching elements; and
- an inner, circular-shape element having one of said five binary switching elements.

12. The portable terminal of claim 11 further comprising a graphical representation of said input device, wherein said graphical representation appears in said display screen, and further wherein said graphical representation provides an indication of said transition, if any, caused by actuating said five binary switching elements.

13. The portable terminal of claim 11 wherein there are no operating modes of said portable terminal in which any of said four binary switching elements of said ring-shape element or said one binary switching element of said circular-shape element are capable of sending a signal representative of an integer number selected from the group of integer numbers consisting of one through nine.

14. The portable terminal of claim 11 wherein no other input device disposed on said cover is capable of sending a signal representative of an integer number selected from the group of integer numbers consisting of one through nine.

15. The portable terminal of claim 12 wherein said graphical representation comprises an outer, ring-shape region and an inner, circular shape region.

16. The portable terminal of claim 12 wherein said graphical representation changes with some changes in mode of said portable terminal.

* * * * *